United States Patent Office 3,618,167
Patented Nov. 9, 1971

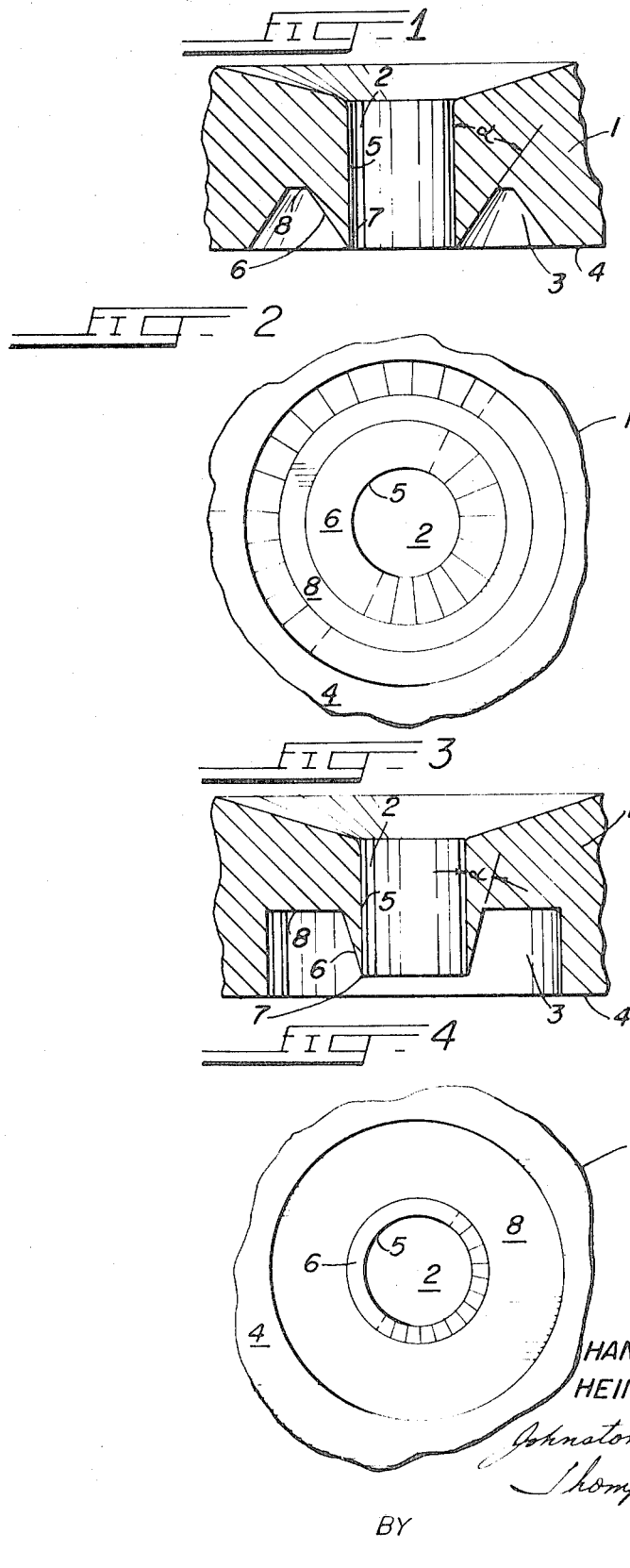

3,618,167
APPARATUS FOR THE MELT EXTRUSION OF LINEAR FIBER-FORMING OR FILM-FORMING THERMOPLASTIC POLYMERS
Hans-Joachim à Brassard and Heinz-Josef Jütten, Oberbruch, Germany, assignors to Glanzstoff AG, Wuppertal, Germany
Filed Feb. 28, 1969, Ser. No. 803,300
Claims priority, application Germany, Mar. 2, 1968,
P 17 10 621.7
Int. Cl. D01d *3/00*
U.S. Cl. 18—855    8 Claims

ABSTRACT OF THE DISCLOSURE

Apparatus for the extrusion of a high molecular weight, linear, thermoplastic polymer melt into filaments, yarns, ribbons, foils and the like, said apparatus including a nozzle plate in which each spinning or extrusion aperture is encircled on the outlet face of the plate by a reentrant groove meeting with the inner wall surface of the aperture at an acute angle to form a sharp or pointed ridge, preferably at an apex angle of less than 45°.

---

In the melt-spinning or extrusion of high molecular weight thermoplastic polymers, especially linear, fiber-forming or film-forming synthetic polymers such as polyamides (nylon 6 or nylon 6, 6), polyesters (polyethylene terephthalate), polyolefins or polyurethanes, etc., operating difficulties often occur due to the force of adhesion between the surfaces of the spinning or extrusion nozzles, i.e. the die surfaces, and the melt itself. The jet or stream of the thermoplastic melt, whether in the form of a filament or a thin film, tends to bow outwardly as it leaves the nozzle opening or extrusion aperture on account of the cohesive force of the melt which influences the formation of drops, i.e. its surface tension which tends to contract the liquid surface. Thus, as these drops or laterally bowed surfaces of the extruded melt come into close contact with the outlet face of the die or nozzle plate, the melt wets and spreads outwardly onto this outlet face by reason of the force of adhesion.

Where the nozzle plate face is wetted or coated with the melt, e.g. directly adjacent to the nozzle openings, the relatively high nozzle temperatures and presence of atmospheric oxygen combine to cause the formation of hard and solid combustion or degradation residues of the melt, these residues adhering tightly to the outlet face of the nozzle plate and gradually accumulating over a period of time. These residues or accumulations eventually result in a disturbance of the uniform running off or extrusion of the melt as indicated by the abnormal breaking of filaments or threads and the non-uniform cross-sectional structure of filaments, films or the like.

In order to diminish or partially avoid such difficulties attributed to the adhesion of the molten polymer collecting on the metal surfaces of the spinning nozzle or extrusion die, attempts have been made to coat the surfaces of the openings in the nozzle plate and the outlet face thereof with a very thin layer of a lubricating agent such as paraffins, silicones, various heat-resistant organic silica compounds or polytetrafluoroethylene. However, spinning heads or extrusion dies treated in this manner must be recoated within only about 24 hours on the average. Furthermore, the above noted disturbances of the spinning or extruding operation cannot be entirely avoided, and the regular and frequent recoating of the nozzle surfaces causes highly undersirable and uneconomical interruptions in otherwise continuous production runs. Actually, no coating or lubricating materials are known which will effect a real reduction in disturbances of the extrusion or spinning irregularities.

It is an object of the invention to provides an improved construction or arrangement of the face plate or so-called nozzle plate in an otherwise conventional spinning head or extrusion die for the production of filaments, films and the like from a thermoplastic polymer melt, whereby the above-mentioned problems can be more fully avoided and a uniform spinning or extrusion can be carried out continuously over an extended period of time without replacing or resurfacing the nozzle plate.

It has now been found, in accordance with the invention, that a substantial improvement is achieved in the spinning or extrusion of the polymer melt by using apparatus wherein the nozzle plate has at least one aperture extending therethrough, provided that the nozzle plate contains on its outlet face a reentrant groove free of any aperture therethrough encircling each aperture so as to define a pointed ridge therewith, the reentrant surface portion of the groove adjacent the aperture and the inner wall surface of the aperture meeting at an acute angle. In general, it is advisable for this acute angle forming the ridge or apex of the connected surfaces to be less than 45°. The apex of the pointed ridge may fall in approximately the same plane as the outlet face of the nozzle plate or it can be recessed inwardly of this outlet face.

Spinning heads or extrusion dies are generally constructed with a housing having means to feed the polymer melt to a nozzle plate mounted at the discharge or outlet end of the housing. In spinning filaments, the nozzle plate contains one and usually a plurality of bores or extrusion channels terminating in small openings or apertures arranged in a regular geometric pattern on the outlet face of the nozzle plate. This conventional construction of a spinning head or extrusion die does not constitute the specific improvement of the present invention except in combination with the particular grooved or concentrically recessed portions of the outlet face around each aperture. However, the invention is especially useful in providing an improvement in spinning heads for the production of filaments where the apertures are circular in shape and have a diameter of about 100 to 4000 microns.

The groove or annular recess around each aperture should completely encircle or surround the aperture so as to provide the desired ridge or pointed edge completely around the circumference of the shaped polymer melt at its point of extrusion from the nozzle plate. With a circular opening for spinning filaments out of a cylindrical bore or tube in the nozzle plate, it is particularly easy to provide a circular or annular groove by machining out a small annular portion of the outlet surface of the plate. However, the invention is also capable of being adapted to non-circular or irregular profiled extrusion apertures, e.g. a thin rectangular opening as used for the production of films or small polygonal, elliptical or similar profiled openings as used for the production of correspondingy profiled filaments. In all cases, the grooves must be adapted to the same profile so that the pointed ridge extends around the opening while pointing in the direction of flow of the extruded melt.

The size of the pointed angle of the ridge or sharp edge in the construction according to the invention is dependent to some extent on the material of the nozzle plate and the properties of the melt itself. The optimum size of the angle can be easily determined by a few routine trials. In general, however, one can prevent the melt from creeping back onto the outer wall or surface around the spinning or extrusion aperture in all cases if the pointed angle formed by the wall of the spinning or extrusion channel and the innermost wall of the groove is less than 45°.

The depth of the groove or annular recess should normally be at least about one-third or one-half of the diameter or width of the extrusion aperture and normally does not need to exceed this diameter or width. The width of the annular groove, i.e. from the ridge or inner circumference to the outer circumference may also be maintained within approximately these same limits, e.g. from about one-third up to the diameter or width of the extrusion aperture. However, such dimensions can be varied over a relatively broad range, it being understood that it is generally not economical to machine out or cut away too much of the nozzle plate. On the other hand, the groove must be sufficiently large to prevent the polymer melt from bridging or extending across the resulting gap during normal operation.

When constructed in accordance with the invention, the apertured and grooved nozzle plates have been actually used in practice, e.g. to produce polyethylene terephthalate and nylon filaments, with a continuous, disturbance-free running time of more than 12 days. This represents a very substantial saving in time, i.e. an overall increase in production capacity per spinning unit, as well as a much more uniform quality of filaments free of breakage.

The apparatus of the invention is further illustrated by the accompanying drawing wherein similar parts are designated by the same reference numeral and wherein:

FIG. 1 is a cross-sectional view through a single opening or extrusion channel of a cut-away portion of a nozzle plate, illustrating one embodiment of the invention;

FIG. 2 is a plan or end view toward the outlet face of the nozzle plate portion shown in FIG. 1;

FIG. 3 is a cross-sectional view which illustrates another embodiment of the invention similar to FIG. 1 but with the formed ridge or pointed edge being recessed inwardly from the outlet face of the nozzle plate and with slightly different dimensions of the groove and ridge; and FIG. 4 is a plan or end view toward the outlet face of the nozzle plate portion shown in FIG. 3.

The nozzle plate 1 mounted in a conventional die housing or spinning head (not shown) is shown in FIGS. 1 and 3 in a position where the molten polymer enters from above and is extruded downwardly through the spinning opening or extrusion channel 2 so as to be drawn off by any conventional means below the nozzle plate. Each plate may contain a large number of such openings 2, each constructed in the same manner as that shown in the drawings and providing an outlet opening on the face 4 of the nozzle plate 1.

The annular groove 3 extends completely around the opening 2 so that the inner wall 5 of the channel 2 forms an acute angle α with the concentric innermost wall 6 of the groove 3. The ridge or apex 7 of the resulting angle between the walls 5 and 6 can be positioned to lie in the same plane as the outlet face 4, as shown in FIG. 1, or it can be recessed inwardly or before this outlet face 4, as shown in FIG. 2.

If desired, the recessed base 8 of the groove 3 may have a flat or planar shape extending transversely or perpendicularly to the axis of the openings, or this base 8 may also have a curved shape. It is preferable to avoid a deep notch or sharply angled base of the groove because this could substantially reduce the strength of the nozzle plate which is placed under the normal pressure of the polymer melt being extruded.

Other minor variations in construction can be made without departing from the spirit or scope of the invention as defined herein.

The invention is hereby claimed as follows:

1. In an apparatus having a nozzle plate containing at least one aperture therethrough for the extrusion of a high molecular weight, linear, fiber-forming or film-forming thermoplastic polymer melt, the improvement which comprises said nozzle plate containing on the outlet face thereof a reentrant groove free of any aperture therethrough encircling each extrusion aperture so as to define a pointed ridge with said aperture, the reentrant surface portion of the groove adjacent said aperture and the inner wall surface of said aperture meeting at an acute angle.

2. An apparatus as claimed in claim 1 wherein the acute angle formed between the groove and said aperture is less than 45°.

3. An apparatus as claimed in claim 1 wherein said aperture has a circular shape and is encircled by an annular groove.

4. An apparatus as claimed in claim 2 wherein said aperture has a circular shape and is encircled by an annular groove.

5. An apparatus as claimed in claim 2 wherein the apex of said pointed ridge falls in approximately the same plane as the outlet face of said nozzle plate.

6. An apparatus as claimed in claim 2 wherein the apex of said pointed ridge is recessed inwardly from the outlet face of said nozzle plate.

7. An apparatus as claimed in claim 4 having a plurality of said extrusion apertures for the spinning of filaments, each circular aperture having a diameter between about 100 and 4000 microns.

8. An apparatus as claimed in claim 4 wherein the width of the annular groove is sufficient to prevent a polymer melt being extruded through said aperture from bridging the gap provided by said groove during melt spinning of said polymer into filaments.

References Cited

UNITED STATES PATENTS

| | | | |
|---|---|---|---|
| 1,685,640 | 9/1928 | Leaver | 18—8 SM X |
| 3,469,280 | 9/1969 | Mott | 18—8 SS |
| 3,106,748 | 10/1963 | Skobel | 18—13 C X |

J. SPENCER OVERHOLSER, Primary Examiner

N. E. LEHRER, Assistant Examiner

U.S. Cl. X.R.

18—8 A